Aug. 5, 1958
P. W. HARLAND
2,845,964
LIQUID DISPENSING DEVICE
Filed May 13, 1955
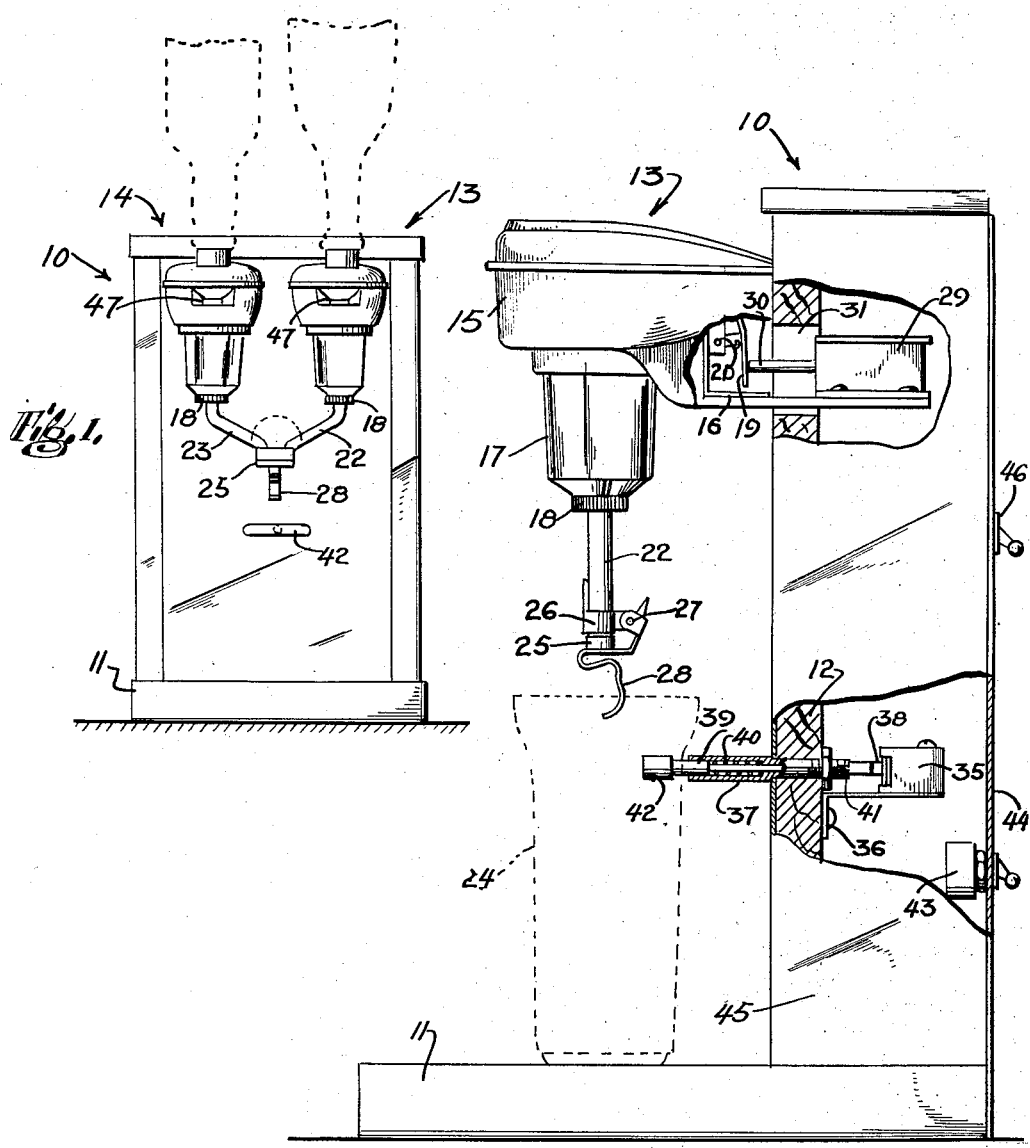
Fig. 1.
Fig. 2.
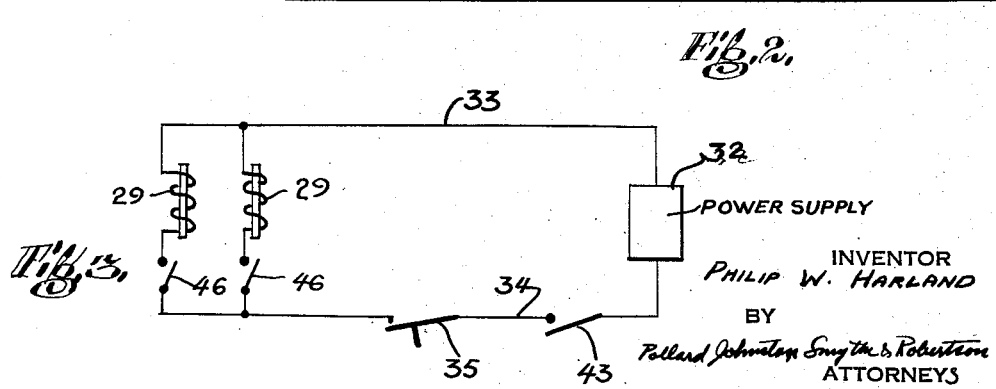
Fig. 3.
INVENTOR
PHILIP W. HARLAND
BY
Pollard Johnston Smyth & Robertson
ATTORNEYS United States Patent Office 2,845,964
Patented Aug. 5, 1958

2,845,964

LIQUID DISPENSING DEVICE

Philip W. Harland, Sellersville, Pa., assignor to American Machine and Metals, Inc., New York, N. Y., a corporation of Delaware Application May 13, 1955, Serial No. 508,091

4 Claims. (Cl. 141—104)

The present invention relates generally to liquid dispensing devices, and is particularly directed to an electrically operated apparatus for simultaneously delivering accurately measured quantities of two or more liquids from related bottles containing the same.

Heretofore, arrangements have been proposed for delivering measured quantities of two liquids, said arrangement comprising two liquid dispensing devices of the kind operated by a reciprocating movement of an outlet member through which the related liquid is delivered, and a common delivery member having branches connected to the outlet members of the two liquid dispensing devices so that the latter are simultaneously operated when an upward thrust is applied either directly to the common delivery member or to an operating member coupled mechanically to the latter. Such a mechanical arrangement for simultaneously operating the two liquid dispensing devices is disadvantageous in that the manually applied force required to actuate the reciprocable outlet members of even two of such dispensing devices is substantial, and this defect is exaggerated when measured quantities of more than two liquids are to be delivered and a correspondingly increased member of dispensing devices are employed. Since the manually applied force for operating the liquid dispensing devices is normally exerted by the operator while holding a glass or other container under the discharge opening of the common delivery member, such glass or container may be easily jarred when a relatively large force has to be applied. Further, in the existing arrangement, the manually reciprocated common delivery member mechanically linking together the reciprocable outlet members of the individual liquid dispensing devices represents a cumbersome movable part that must be accurately machined and is, even then, difficult to maintain in proper alignment for providing trouble-free and relatively smooth operation. Since the individual liquid dispensing devices are mechanically linked together for simultaneous operation, all of the liquid dispensing devices must operate during each stroke of the common delivery member and, therefore, there is no possibility of varying the combination of liquids entering into the delivery member.

Accordingly, it is an object of the present invention to provide an electrically operated apparatus for simultaneously delivering accurately measured quantities of liquids from two or more related liquid dispensing devices and which overcomes the above mentioned disadvantages of the existing, mechanically operated arrangement.

A more specific object is to provide an apparatus for simultaneously delivering accurately measured quantities of liquids from two or more related liquid dispensing devices, wherein each liquid dispensing device is operated by an associated solenoid, and the energization of the solenoids is effected by an electrical circuit having a control switch therein which is adapted to be manually actuated, so that the manually applied force is only that required for actuation of the control switch and the forces for operating the individual liquid dispensing devices are derived from electrical power to permit any number of such dispensing devices to be combined together without increasing the force that must be manually applied.

Another object is to provide an electrically operated apparatus for simultaneously delivering accurately measured quantities of liquids from two or more related liquid dispensing devices, and wherein the devices to be simultaneously operated can be conveniently selected to vary the liquids included in the resultant mixture.

A further object is to provide electrically operated apparatus of the described character, wherein delivery members extend from the two or more liquid dispensing devices and are shaped so that the discharge ends of said delivery members are disposed adjacent each other, and the electrical operation of the liquid dispensing devices is controlled by a switch having an actuator associated therewith which is disposed so as to be engaged by a glass or other container, as the latter is moved to a position under said adjacent discharge ends of the delivery members.

In one aspect of the invention, two or more devices for dispensing accurately measured quantities of related liquids are mounted side-by-side on the front of an upright support and are provided with delivery members which are shaped so that the discharge ends thereof are disposed immediately adjacent each other. An operating solenoid is associated with each of the liquid dispensing devices to cause the related dispensing device to deliver an accurately measured quantity of liquid whenever the solenoid is energized, and the solenoids are connected in parallel in an electrical circuit having a normally open control switch interposed therein. An actuating plunger projects forwardly from the upright support at a level below the discharge ends of the delivery members to be moved rearwardly by a glass, or other container, positioned under said discharge ends, and the plunger is connected to the control switch so that the latter is closed by such rearward movement of the plunger and thereby closes the electrical circuit for simultaneous energizing of the solenoids, thereby to operate the associated dispensing devices. If desired, the coil of each solenoid may have an independent, manually operable switch which, when closed, makes the related solenoid respond to the actuation of the main control switch and, when opened, removes the related solenoid from the energizing electrical circuit, whereby certain of the liquid dispensing devices may be selected for simultaneous operation to vary the liquids included in the mixture. Preferably, a movable cover is provided for the discharge ends of the delivery members extending from the several dispensing devices to prevent the dripping of liquid from such discharge ends when no glass, or other container, is disposed thereunder, and the movable cover has a member associated therewith engageable by a glass, or other container, moved under said discharge ends to displace the cover to an inoperative position.

The above, and other objects, features and advantages of the invention will become apparent from the following description and drawing which are merely exemplary.

In the drawing:

Fig. 1 is a front elevational view of an apparatus for dispensing measured quantities of two liquids in accordance with one embodiment of this invention;

Fig. 2 is a side elevation view, partly broken away, of the apparatus of Fig. 1, but on an enlarged scale; and Fig. 3 is a wiring diagram of an electrical circuit included in the apparatus of Figs. 1 and 2.

Referring to the drawing in detail, and initially to Figs. 1 and 2 thereof, an apparatus embodying the present invention is there illustrated and generally identified by the reference numeral 10. The apparatus 10 includes a support made-up of a base 11 and an upright 12 extending from the base adjacent the back edge of the latter. Mounted on the upright 12, at elevated locations, are two liquid dispensing devices arranged side-by-side in front of the upright and generally identified by the reference numerals 13 and 14, respectively. Although only two liquid dispensing devices are included in the illustrated apparatus 10, it is to be understood that a greater number of such devices may be included and, in fact, a major advantage of this invention resides in the extent to which it is adaptable to increased numbers of liquid dispensing devices.

Each of the liquid dispensing devices 13 and 14 of the illustrated embodiment is preferably of the type disclosed generally in United States Letters Patent No. 2,631,755, and, as such, each of the dispensing devices includes a housing 15 on the top of which a closure and bottle holding unit (not shown) is adapted to be secured, for example, as shown in United States Letters Patent No. 2,559,815, issued July 10, 1951, to R. W. Woodward. Such a closure and bottle holding unit has the function of supporting a bottle containing a liquid to be dispensed in inverted position upon the housing 15, as represented in broken lines on Fig. 1, and of preventing the removal of the bottle by an unauthorized person. In the present invention, the snap action portion of the device of said application is omitted, the solenoid 29 acting directly on the valve actuator.

A base plate 16 is affixed within the lower portion of the housing 15, and a measuring cup 17 depends from the plate 16 and has an outlet 18 at its lower end through which a measured quantity of the contents of the related bottle is dispensed each time an actuating arm 19 is actuated. A valve member (not shown) is reciprocable within the housing 15 between a normal or rest position, wherein it closes the outlet 18 and opens the inlet to the measuring cup 17 to permit filling of the latter, and an operated position, wherein the valve member closes the inlet to the measuring cup 17 and opens the outlet 18 from the latter to permit draining of the quantity of liquid previously supplied to the measuring cup from the associated bottle. Obviously, the quantity of liquid dispensed from the cup 17 during each movement of the related valve member to its operated position will depend upon the internal volume of the measuring cup, and this volume may be varied either by replacing the cup 17 with one of the desired innternal volume, or by placing solid inserts within the cup to decrease the free internal volume of the latter to the desired extent.

In the preferred type of liquid dispensing device, the actuating arm 19 and the related reciprocable valve member is arranged so that when the arm is rocked about its pivot 20 in the direction moving the lower end of the trigger from right to left, as viewed in Fig. 2, the valve member undergoes a movement to its operative position, whereby the outlet and inlet of the measuring cup 17 are completely opened and closed, respectively, substantially simultaneously to prevent any additional flow of liquid into the measuring cup after the outlet from the latter has been opened. Similarly, when the arm 19 is returned to its original position, for example, by the solenoid actuating mechanism, the valve member is snapped back to its normal or rest position thereby to close and open the outlet and inlet, respectively, of the measuring cup substantially simultaneously so that the refilling of the cup 17 does not commence until the outlet 18 has been completely closed.

As seen in Fig. 1, delivery members 22 and 23, which which may be in the form of suitably bent pipes, extend from the outlets 18 of the liquid dispensing devices 13 and 14, respectively, and are shaped so that their discharge or lower ends are located closely adjacent each other, preferably at a central location with respect to the devices 13 and 14 in order to simultaneously discharge the measured quantities of liquid dispensed by the related devices 13 and 14 into a glass, or other container 24, shown in broken lines on Fig. 2, disposed on the base 11 below the discharge ends of delivery members 22 and 23. Preferably, a movable cover 25 is provided on the discharge ends of the delivery members 22 and 23 to prevent dripping of liquid from the latter in the absence of a glass, or other container to receive the liquid. As seen in Fig. 2, a band 26 encircles the adjacent discharge ends of the delivery members and supports a pivot pin 27 on which the cover 25 is rockably mounted for swinging between an operative position, shown in the drawing, and a rearwardly rocked position in which the discharge ends of the delivery members 22 and 23 are uncovered. The cover 25 may be yieldably urged to its operative position by a torsion spring (not shown) associated with the pin 27, and a suitably bent, resilient strip 28 extends downwardly from the cover 25 and is engageable by the glass 24 to swing the cover to its rearwardly rocked position as the glass is displaced rearwardly over the base 11 to a position under the discharge ends of delivery members 22 and 23.

In accordance with this invention, the liquid dispensing devices 13 and 14 are electrically operated and, for this purpose, a solenoid 29 is mounted on the back of the upright 12 and in line with each of the devices 13 and 14. The movable core or armature of each solenoid 29 is connected to a plunger 30 extending forwardly through a suitable opening 31 in the upright and engageable with the arm 19 of the related one of the dispensing devices 13 and 14. When the solenoid 29 is energized, the plunger 30 moves forwardly against the lower portion of the arm 19 of the related dispensing device and rocks the arm in the direction for moving the associated valve member to its operative position so that a measured quantity of liquid is discharged through the delivery member. When the solenoid 29 is deenergized, the plunger 30 moves rearwardly and the arm 19 of the related dispensing device can then rockably return to the position thereof corresponding to the normal or rest position of the associated valve member.

Referring to Fig. 3 of the drawing, it will be seen that the solenoids 29 associated with the liquid dispensing devices 13 and 14 are energized by an electrical circuit including a source 32 of electric current having conductors 33 and 34 extending from the opposite sides thereof, and with the coils of the solenoids being connected in parallel between the conductors 33 and 34. In order to control the energization of the solenoids 29, a main control switch 35, preferably in the form of a normally open snap action switch, is electrically interposed in the conductor 34 and is mounted on a suitable bracket 36 in back of the upright 12. A guide tube 37 extends through the upright 12 in axial alignment with the actuating pin 38 of the snap action switch 35, and a plunger 39 extends slidably through the tube 37 to be engageable, at its back end, with the pin 38. A compression spring 40 is disposed around a reduced diameter portion of plunger 39 and bears, at its opposite ends, against a shoulder on the plunger 39 and a shoulder within the guide tube 37 to yieldably urge the plunger forwardly. In order to limit the forward movement of plunger 39, a pin 41 extends diametrically through the back end portion of the plunger and engages in longitudinally extending, rearwardly opening slots in the guide tube 37.

At its forward end, the plunger 39 carries a laterally elongated actuating member 42, which is preferably arcuate and engageable by the glass 24 positioned under the discharge ends of delivery members 22 and 23 so that, as the glass 24 is moved rearwardly to the position illustrated on Fig. 2, the plunger 39 is displaced rearwardly from its spring urged position and depresses the pin 39 to close the normally open snap action switch 35. When the switch 35 is closed, the several solenoids are energized and thereby effect simultaneous operation of the liquid dispensing devices so that measured quantities of the related liquids are discharged into the glass. Upon the forward removal of the glass 24 from the position of Fig. 2, the plunger 39 is released and is returned to its forward position by the spring 40, whereupon, the snap action switch 35 is opened and the several solenoids are against deenergized.

If desired, a master switch 43, which is manually controlled, is connected in series with the switch 35, and the switch 43 is mounted on a removable back plate 44 forming part of a housing 45 encasing the electrical components of the apparatus 10 on the back of upright 12. Normally, the switch 43 is maintained in its closed condition to permit operation of the dispensing devices 13 and 14 by manipulation of the plunger 39. However, when the apparatus 10 is not in use, the switch 43 may be opened to prevent dispensing of the liquids by inadvertent manipulation of the plunger 39.

Further, the apparatus embodying this invention may include a selector switch 46 connected in series with each of the solenoids 29 between the latter and the conductor 33 or 34 so that, when one or more of the switches 46 is in its opened condition, the related solenoid is de-energized without regard to the condition of the control switch 35. Thus, in the apparatus 10, both of the liquid dispensing devices 13 and 14 can be operated simultaneously to discharge a mixture of measured quantities of the related liquids, or one of the devices 13 and 14 can be rendered inoperative so that the other dispensing device then discharged measured quantities of the selected liquid. It is apparent that, when more than two liquid dispensing devices are combined together in an apparatus embodying this invention, the provision of the selector switches 46 makes it possible to select any two or more of the dispensing devices for simultaneous operation, so that the liquids contained in the discharged mixture can be varied at will.

Preferably, at least one of the dispensing devices contains a tally register which exhibits at a window 47 the number of times the arm of the related device has been operated. Of course, when the several dispensing devices are capable of individual operation, for example, by inclusion of the selector switches 46 in the electrical circuit, each of the dispensing devices should have a tally register associated therewith.

A further advantage of the apparatus embodying this invention resides in the fact that any number of electrically operated liquid dispensing devices may be included for simultaneous operation, or for operation in selected combinations, without increasing the required manually applied force for actuating the switch 35. It will also be noted that the removal of the cover 25 from the discharge ends of the several delivery members and the actuation of the plunger 39 controlling switch 35 both result from the normal or natural rearward movement of the glass, or other container 24 under the delivery members, while the forward withdrawal of the glass containing the dispensed liquid or liquids serves to restore the cover 25 and plunger 39 to their respective normal positions. Thus, the apparatus can be employed repeatedly with little exertion by the operator, and the natural movements of the glass 24 required for operation of the apparatus tend to avoid tipping or jarring of the glass that would result in spilling of the contents.

Although a particular embodiment of the invention has been described in detail herein and shown in the accompanying drawing, it will be understood that such embodiment is merely illustrative, and that various changes and modifications may be effected therein as are fairly within the scope and spirit of the appended claims.

What is claimed is:

1. Apparatus for delivering measured quantities of liquids comprising a plurality of dispensing devices each of which includes an outlet and an actuating arm and is operative to discharge a measured quantity of a related liquid through said outlet in response to each actuation of said arm, delivery members extending from said outlets of the dispensing devices and having discharge ends located adjacent each other to deliver the measured quantities of liquids from the related dispensing devices into a container disposed below said discharge ends, electrically energized operating means associated with each of said dispensing devices and operative to effect a single actuation of the related arm whenever said operating means is energized, an electric circuit for energizing said operating means and having a normally open control switch interposed therein, and switch actuating means disposed below said discharge ends of the delivery members positioned so as to be engageable by a container held in fluid receiving position below said discharge ends, said switch activating means being operative to close said control switch when engaged by said container, whereby said operating means are energized and the corresponding dispensing devices deliver measured quantities of liquids through said delivery members into the container.

2. Apparatus for delivering measured quantities of liquids comprising an upright support, a plurality of dispensing devices mounted on one side of said support and each including an outlet and an actuating arm, each of said dispensing devices being operative to discharge a measured quantity of a related liquid through said outlet in response to each actuation of said arm, delivery members depending from said outlets and having discharge ends located adjacent each other to deliver the measured quantities of liquids from the related dispensing devices into a container at a position below said discharge ends, electrical operating means associated with each of said dispensing devices and operative to effect a single actuation of the related arm whenever said operating means is energized, an electric circuit for energizing said operating means and having a normally open control switch interposed therein, and switch actuating means disposed below said discharge ends so as to be engageable by a container moved to said position under the discharge ends in the direction toward said support to then close said control switch in response to said movement of the container, whereby said operating means are energized and the corresponding dispensing devices deliver measured quantities of liquids through said delivery members into the container.

3. Apparatus for delivering measured quantities of liquids comprising an upright support, a plurality of dispensing devices mounted on one side of said support and each including an outlet and an actuating arm, each of said dispensing devices being operative to discharge a measured quantity of a related liquid through said outlet in response to each actuation of said arm, delivery members depending from said outlets and having discharge ends located adjacent each other to deliver the measured quantities of liquids from the related dispensing devices into a container at a position below said discharge ends, electrical operating means associated with each of said dispensing devices and operative to effect a single actuation of the related arm whenever said operating means is energized, an electric circuit for energizing said operating means and including a source of current, parallel branches containing said operating means and a normally open control switch interposed between said source and said parallel branches, said circuit further including a selector switch in each of said branches in series with the related operating means so that the latter can be energized only when the related selector switch is closed, and switch actuating means disposed below said discharge ends so as to be engageable by a container moved to said position under said discharge ends in the direction toward said support to then close said control switch in response to said movement of the container, whereby the operating means associated with closed selector switches are energized and the corresponding dispensing devices deliver measured quantities of liquids through said delivery members into the container.

4. Apparatus for delivering measured quantities of liquids comprising an upright support, a plurality of dispensing devices mounted on one side of said support and each including an outlet and an actuating arm, each of said dispensing devices being operative to discharge a measured quantity of a related liquid through said outlet in response to each actuation of said arm, delivery members depending from said outlets and having discharge ends located adjacent each other to deliver the measured quantities of liquids from the related dispensing devices into a container at a position below said discharge ends, electrical operating means associated with each of said dispensing devices and operative to effect a single actuation of the related arm whenever said operating means is energized, an electric circuit for energizing said operating means and having a normally open snap action switch interposed in said circuit and disposed at the other side of said support, an actuating plunger extending slidably through said support and engageable at one end with said snap action switch to close the latter in response to movement of said plunger toward said other side of the support, a container engageable member on said plunger at said one side of the support, and spring means urging said plunger in the direction toward said one side of the support to an inoperative position wherein said container engageable member extends into the area occupied by a container positioned under said discharge ends and said snap action switch is open, whereby the movement of a container to the position under said discharge ends displaces said plunger in the direction for closing the snap action switch to energize said operating means so that the corresponding dispensing devices deliver measured quantities of liquids.

References Cited in the file of this patent

UNITED STATES PATENTS

| | | |
|---|---|---|
| 1,369,740 | Gibbons | Feb. 22, 1921 |
| 2,054,485 | Reeves | Sept. 15, 1936 |
| 2,198,524 | Berwick et al. | Apr. 23, 1940 |
| 2,201,545 | Mazzanobile | May 21, 1940 |
| 2,283,652 | Schwartzkope | May 19, 1942 |
| 2,325,441 | Tucker et al. | July 27, 1943 |
| 2,572,541 | Thompson et al. | Oct. 23, 1951 |
| 2,627,369 | St. Laurence | Feb. 3, 1953 |
| 2,657,628 | Von Stoeser | Nov. 3, 1953 |
| 2,658,645 | Harris, Jr. | Nov. 10, 1953 |

FOREIGN PATENTS

| | | |
|---|---|---|
| 614,431 | Great Britain | Dec. 15, 1949 |

UNITED STATES PATENT OFFICE
CERTIFICATE OF CORRECTION

Patent No. 2,845,964                                        August 5, 1958

Philip W. Harland

It is hereby certified that error appears in the printed specification of the above numbered patent requiring correction and that the said Letters Patent should read as corrected below.

Column 1, line 37, for "member" read -- number --; column 5, line 27, for "discharged" read -- discharges --; column 6, line 13, for "activating" read -- actuating --.

Signed and sealed this 21st day of October 1958.

(SEAL)

Attest:

KARL H. AXLINE

Attesting Officer

ROBERT C. WATSON
Commissioner of Patents